(12) United States Patent
Hama et al.

(10) Patent No.: US 6,340,799 B1
(45) Date of Patent: Jan. 22, 2002

(54) WEIGHING APPARATUS

(75) Inventors: Kazuaki Hama; Fumiya Kobayashi, both of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/421,975

(22) Filed: Oct. 20, 1999

(30) Foreign Application Priority Data

| Oct. 22, 1998 | (JP) | 10-301422 |
| Nov. 24, 1998 | (JP) | 10-333037 |
| Dec. 1, 1998 | (JP) | 10-342085 |

(51) Int. Cl.⁷ .............................................. G01G 21/28
(52) U.S. Cl. .................... 177/238; 177/184; 177/DIG. 9
(58) Field of Search .................................. 177/184, 187, 177/189, 155, 238, 211, 229, 154, DIG. 9, 254, 208

(56) References Cited

U.S. PATENT DOCUMENTS

| 3,526,286 A | * | 9/1970 | Flinth | 177/211 |
| 3,889,529 A | * | 6/1975 | Bradley | 177/208 |
| 4,002,216 A | * | 1/1977 | Solow | 177/254 |
| 4,258,810 A | * | 3/1981 | Susor | 177/DIG. 9 |
| 4,411,327 A | * | 10/1983 | Lockery et al. | 177/DIG. 9 |
| 4,716,979 A | * | 1/1988 | Bradley et al. | 177/208 |
| 5,600,104 A | * | 2/1997 | McCauley | 177/187 |
| 5,859,390 A | * | 1/1999 | Stafford et al. | 177/DIG. 9 |

FOREIGN PATENT DOCUMENTS

| DE | 557024 | * 12/1974 | 177/189 |
| JP | 09178579 | * 11/1997 | |

* cited by examiner

Primary Examiner—Randy W. Gibson
Assistant Examiner—Jason P. Gilchrist
(74) Attorney, Agent, or Firm—Jordan and Hamburg LLP

(57) ABSTRACT

A weighing apparatus is provided which comprises an apparatus body with strain gages; a load button to transmit a weight of an object to be measured to a loading surface of the apparatus body; a top plate on one side of which the load button is installed and to the other side of which the object weight is applied; an elastic member provided around the load button and between the loading surface and top plate; and connecting members to connect the top plate to the loading surface in such a manner that the top plate can move horizontally within a predetermined range and tilt about the load button, and to prevent the top plate from coming out upward. Thus, the weighing apparatus is capable of measuring a large vertical load and sufficiently accommodating deformations caused by horizontal movement and tilting.

10 Claims, 18 Drawing Sheets compressed

WEIGHING APPARATUS

BACKGROUND OF THE INVENTION

1. Field of the Invention:

The present invention relates to a strain gage-based weighing apparatus destined for use in a platform scale, material-feeding hopper, compression tester, tensile tester, etc.

2. Description of Related Art:

FIG. 1 is a plan view, and FIG. 2 is a front view, of a typical example of the conventional weighing apparatuses using strain gages. The weighing apparatus is generally indicated with a reference 100.

As will be best seen in FIG. 2, the weighing apparatus 100 comprises a fixing frame 101, a load receiver 102 having a cylindrical hole 102a formed in the center thereof, a plurality of beam members 103, upper and lower faceplates 104a and 104b, a cylinder 105, an flexible layer 106, strain gages 107, and a loading plate 108. The flexible layer 106 is made of rubber or resilient material and bonded by curing to and between the upper and lower faceplates 104a and 104b. The flexible layer 106 is formed like a disk. The flexible layer 106 is adapted to show dynamic characteristics such as compressive rigidity, flexural rigidity, etc. which are generally point-symmetrical in all directions through the disk center. The cylinder 105 is provided in the center of the lower faceplate 104b having the generally same disk-like shape as the flexible layer 106, and fitted in a circular hole 102a in the load receiver 102. The bottom surface of the load receiver 102 is positioned above a surface on which the weighing apparatus 100 is placed. The plurality of beam members 103 is disposed around the load receiver 102, and securely bonded to and between the load receiver 102 and fixing frame 101. Each of the strain gages 107 is secured to the lower side of each beam member 103 by attaching or otherwise. Thus, when a vertical load is placed on the upper faceplate 104a, it will push down the load receiver 102 via the flexible layer 106 and lower faceplate 104b to bend the beam members 103, thereby changing the resistance of the strain gages 107 on the beam members 103.

For a larger loading surface required for the weighing apparatus, a loading plate 108 is used, and one weighing apparatus 100 is disposed at each of the four corners of the loading plate 108 as shown in FIG. 3.

In these conventional weighing apparatuses, the flexible layer 106 is disposed between the upper faceplates 104a the load receiver 102 in such a manner that the latter can be moved horizontally and tilted in relation to each other.

When an object whose weight is to be measured is placed on the upper faceplate 104a or the loading plate 108, a shock will be produced to apply an external force to the weighing apparatus 100. The components of the weighing apparatus will thermally be contracted and the fixing holes may not possibly be formed precisely in some cases.

The above horizontal relative movability and tiltability of the upper faceplates 104a and the load receiver 102 are intended to accommodate such external force, thermal contraction, formation error, etc. in order to protect the weighing apparatus or weighing apparatuses.

However, the conventional weighing apparatuses are not advantageous as follows:

That is, when too large a vertical load is placed on the upper faceplate 104a or the loading plate 108, the flexible layer 106, if it has no sufficient hardness, will be compressed beyond its elasticity and thus cannot sufficiently accommodate the deformation of the upper faceplate 104a or loading plate 108 caused by the vertical load. For measuring such a large vertical load without any trouble, the flexible layer 106 should be of an increased hardness. As a result, however, the flexible layer 106 will be too stiff for the upper faceplate 104a or loading plate 108 to move horizontally and tilt. Namely, deformation caused by such horizontal movement and tilting will not possibly be accommodated to a sufficient extent.

OBJECT AND SUMMARY OF THE PRESENT INVENTION

Accordingly, the present invention has an object to overcome the above-mentioned drawbacks of the prior art by providing a weighing apparatus capable of measuring a large vertical load and sufficiently accommodating deformations caused by horizontal movement and tilting.

The above object can be attained by providing a weighing apparatus comprising, according to the present invention, an apparatus body with strain gages, a load button to transmit a weight of an object to be measured to a loading surface of the apparatus body, a top plate on one side of which the load button is installed and to the other side of which the object weight is applied, an elastic member provided around the load button and between the loading surface and top plate, and connecting members to connect the top plate to the loading surface in such a manner that the top plate can move horizontally within a predetermined range and tilt about the load button and to prevent the top plate from coming out upward.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
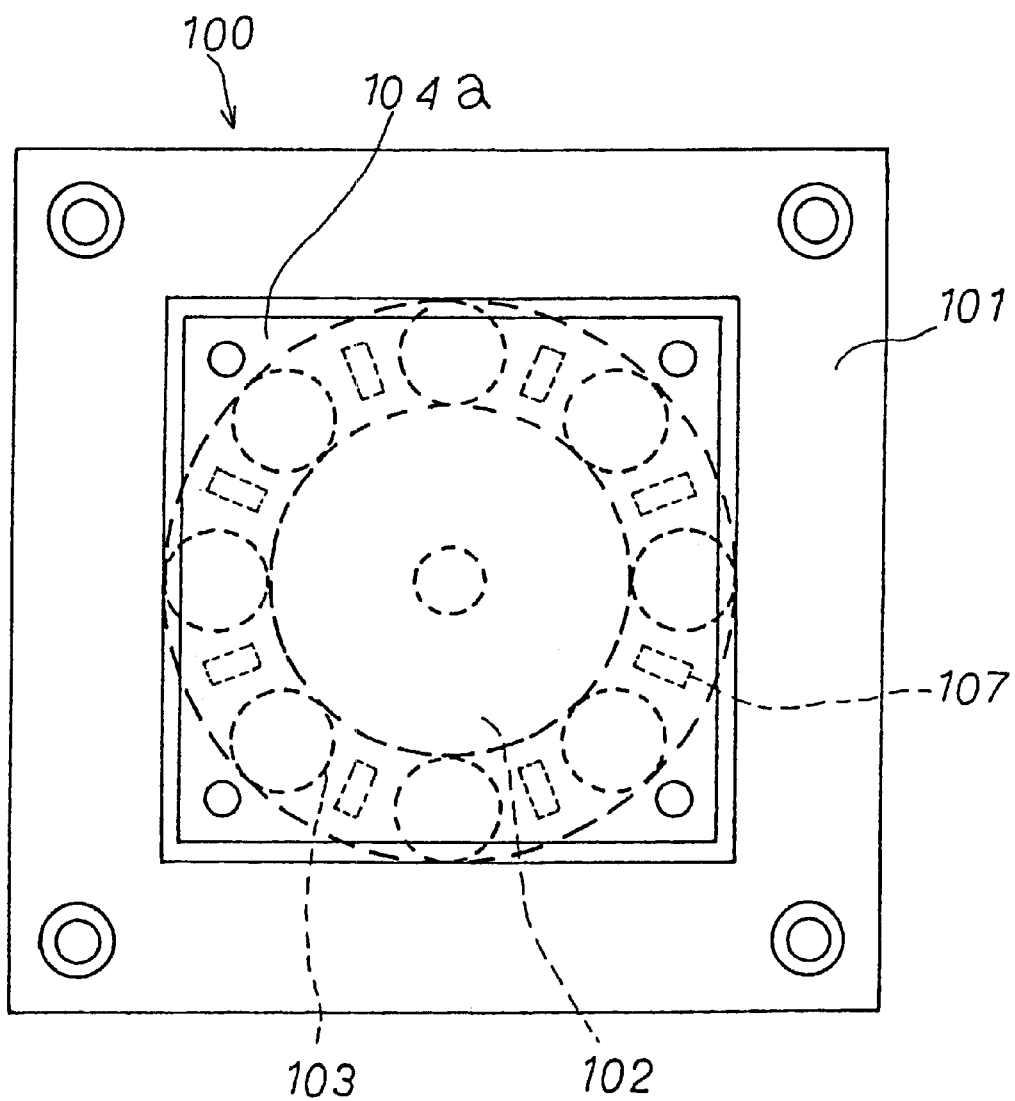
FIG. 1 is a plan view of an example of the conventional weighing apparatuses.
Figure 2:
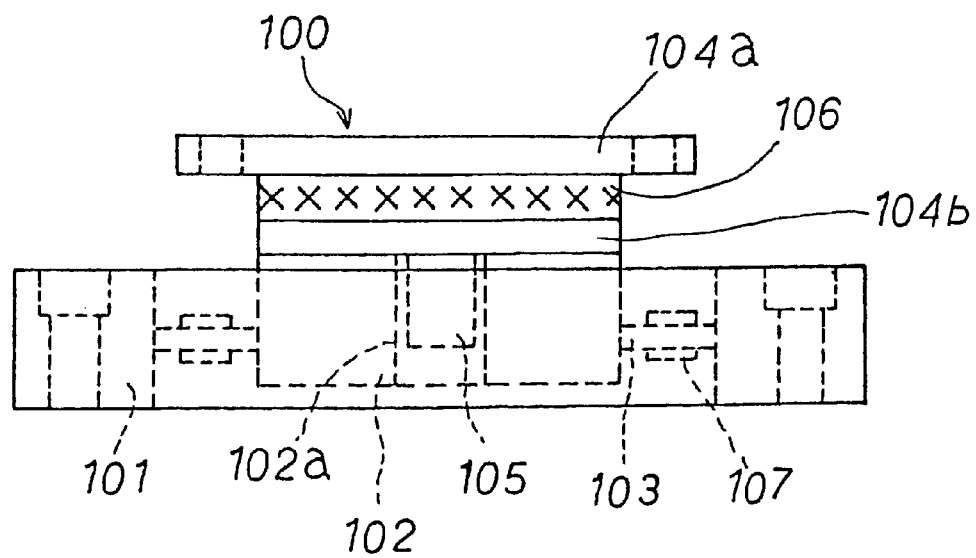
FIG. 2 is a front view of the conventional weighing apparatus in FIG. 1.
Figure 3:
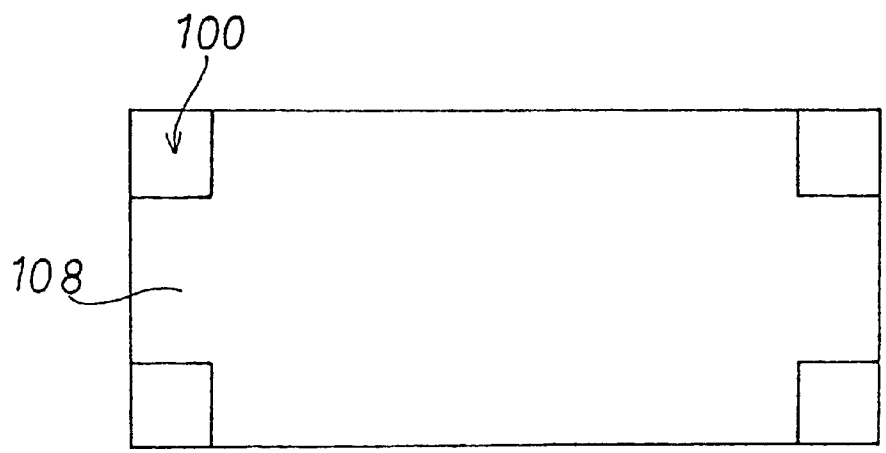
FIG. 3 is a plan view of an example in which the conventional weighing apparatus is installed at each of the four corners of a loading plate.
Figure 4:
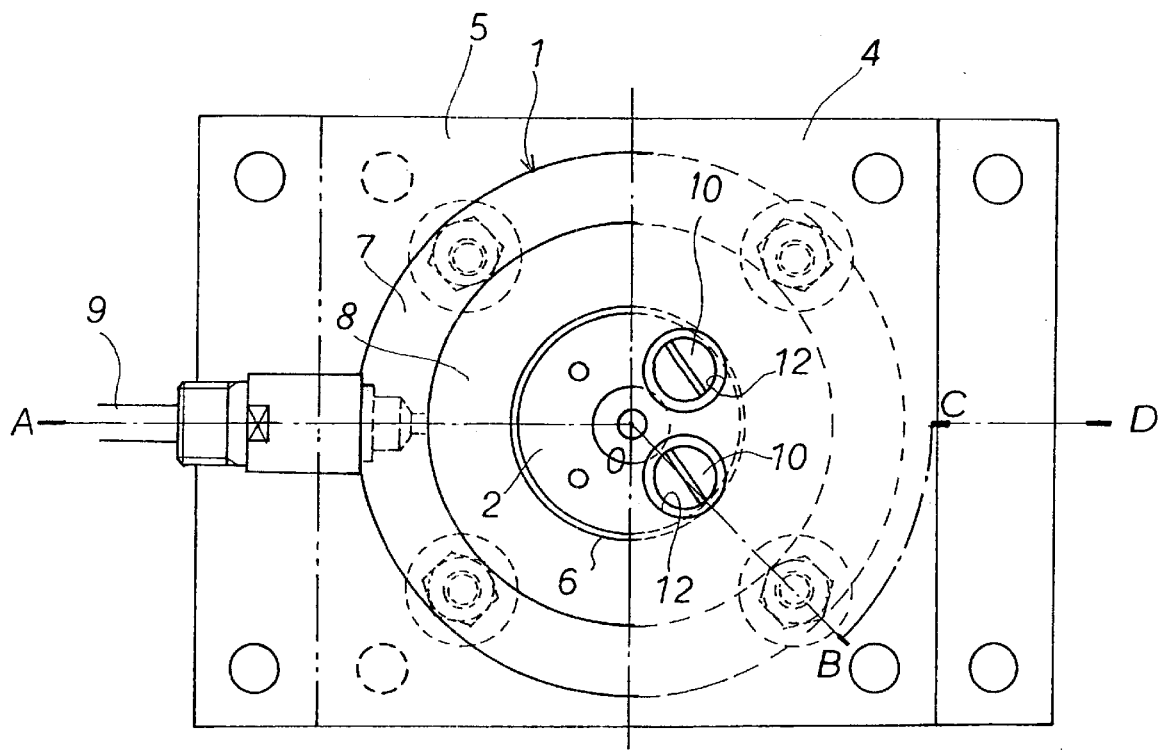
FIG. 4 is a plan view of a first embodiment of the weighing apparatus according to the present invention, with the top plate omitted for easier viewing of the construction of the weighing apparatus.
Figure 5:
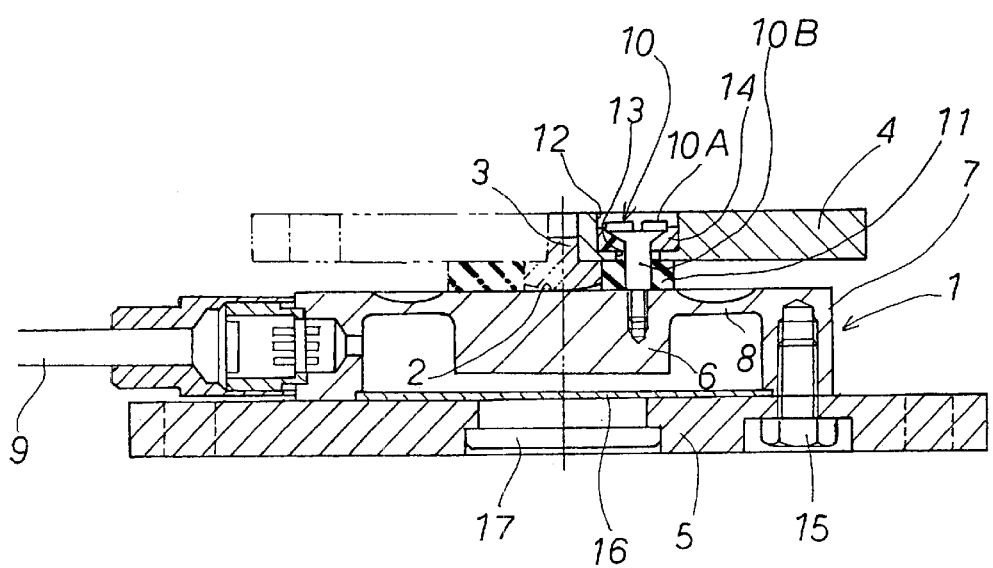
FIG. 5 is a sectional view of the weighing apparatus in FIG. 4, taken along the line A–O–B–C–D in FIG. 4.

FIG. 4 is a plan view of a first embodiment of the weighing apparatus according to the present invention, with the top plate omitted for easier viewing of the inner construction of the weighing apparatus, and FIG. 5 is a sectional view of the weighing apparatus in FIG. 4, taken along the line A–O–B–C–D in FIG. 4.

As shown FIGS. 4 and 5, the first embodiment of weighing apparatus according to the present invention comprises an apparatus body 1, a load button 3, a top plate 4, a base plate 5, a cable 9, and connecting members 10. The apparatus body 1 is formed like a disk as shown. The left half of the top plate 4, load button 3 and elastic member 11 are not shown in FIG. 4. The left half of the top plate 4 is indicated with two-dot chain.

The apparatus body 1 has a loading surface 2. The load button 3 is made of a rigid material such as stainless steel to convey a load to the loading surface 2 of the apparatus body 1. The load button 3 is installed on one side of the top plate 4 to the other side of which the weight of an object to be measured is applied. The load button 3 is rounded at the bottom end thereof.

The apparatus body 1 is installed to the base plate 5 made of a rigid material such as stainless steel. The apparatus body 1 consists of a central portion 6 on which the loading surface 2 is formed, a mounting portion 7 to be fixed to the base plate 5, and a distortable portion 8 connecting the mounting portion 7 and central portion 6 to each other. The apparatus body 1 is wholly made of stainless steel, and has attached to the distortable portion 8 strain gages 20 which will further be described later. Also the apparatus body 1 has connected thereto the cable 9 through which output signals from the strain gages 20 are taken out. The top plate 4 is connected to the loading surface 2 with the connecting members 10.

The elastic member 11 is made of rubber or a resilient material, and provided around the load button 3 and between the loading surface 2 and top plate 4. The connecting means 10 are passed through the elastic member 11 and fixed at the ends thereof to the central portion 6 of the apparatus body 1.

In this embodiment, each of the connecting members 10 has a head portion 10A and a shaft portion 10B thinner than the head portion 10A. The end of the shaft portion 10B is screwed from the loading surface 2 into the central portion 6. In a portion of the top plate 4 in which the connecting means 10 are provided, there are formed a large hole 12 and small hole 13 communicating with each other. The diameter of the small hole 13 is larger than that of the shaft portion 10B while the diameter of the large hole 12 is larger than that of the shaft portion 10B. Further, the diameter of the head portion 10A is larger than that of the small hole 13. Thus, the top plate 4 is horizontally movable within a predetermined range and tiltable about the load button 3. Further, a packing 14 made of an elastic material is provided in the large hole 12 to enclose the head portion 10A. Also, the mounting portion 7 of the apparatus body 1 is secured to the base plate 5 with a bolt 15. A metal seal 16 is provided inside the mounting portion 7 which is a doughnut-like frame, and on the base plate 5. A cap 17 is removably fitted in an opening formed in the center of the base plate 5. The metal seal 16 serves to seal the interior of the apparatus body 1, thereby preventing dust and water from coming into the apparatus body 1. The cap 17 can be removed to operate various adjusting resistors provided inside the apparatus body 1.

Figure 6:
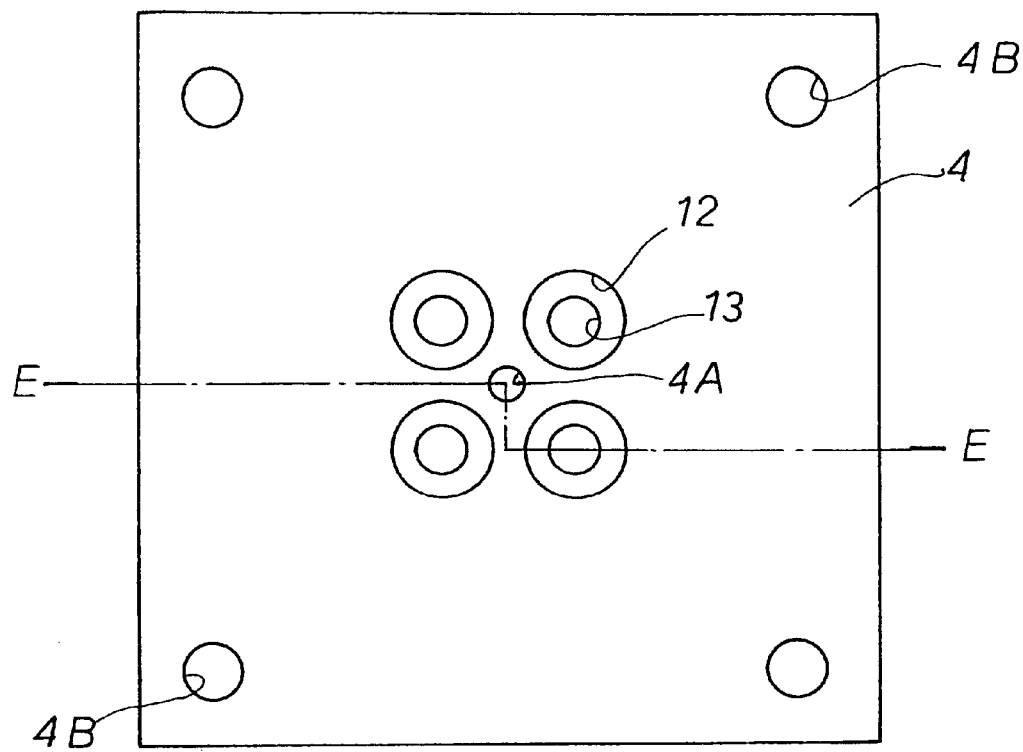
FIG. 6 is a plan view of the top plate.

FIG. 6 is a plan view of the top plate 4. As shown, the top plate 4 has formed therein and around a hole 4A in which he load button 3 is fitted, the large hole 12 and small hole 13 for fixing the connecting members 10, respectively, therein. The top plate 4 has also formed in each of the corners thereof a hole 4B in which a member of the object whose weight is to be measured (corresponding to the loading plate 108 in the conventional weighing apparatus having previously been described) is to be fixed.

Figure 7:
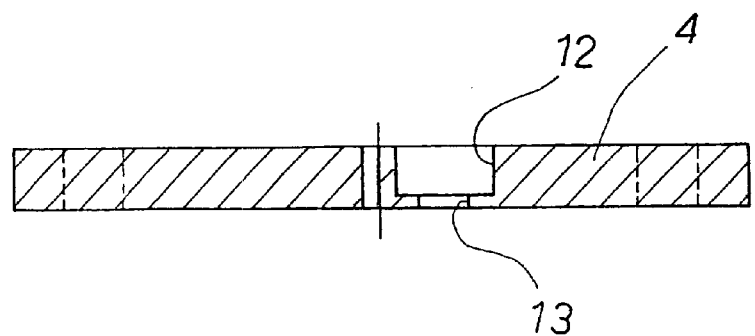
FIG. 7 is a sectional view of the top plate, taken along the line E—E in FIG. 6.

FIG. 7 is a sectional view of the top plate, taken along the line E—E in FIG. 6. In this embodiment, the top plate 4 is made of stainless steel. It has a square plate of 10 mm in thickness and 125 mm in side length. The large hole 12 has a diameter of 17 mm and a depth of 8 mm, while the small hole 13 has a diameter of 9 mm and a depth of 2 mm. The hole 4A has a diameter of 6 mm, and the holes 4B have a diameter of 10 mm.

Figure 8:
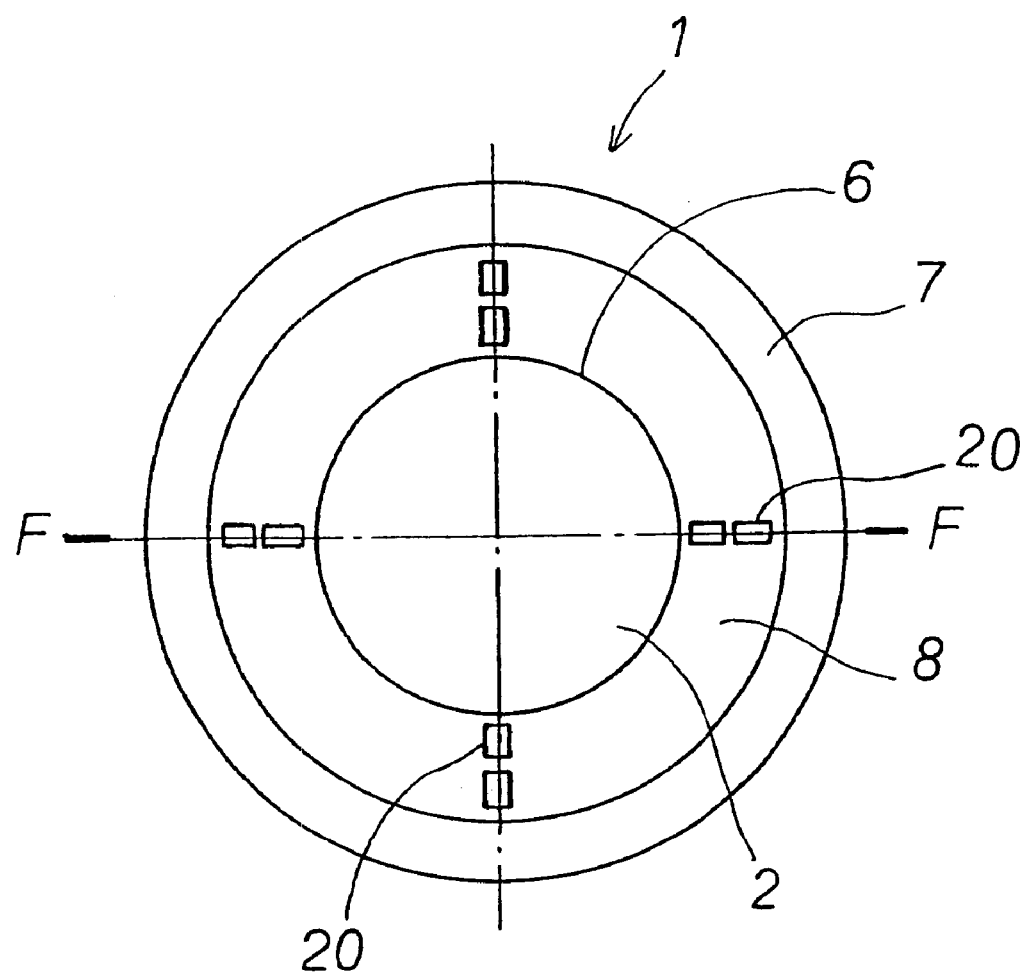
FIG. 8 is a plan view of the body of the weighing apparatus according to the present invention.

FIG. 8 is a simplified plan view of the apparatus body 1 according to the first embodiment of the present invention shown in FIG. 4. As shown, the strain gages 20 are attached along the quadrisection lines, on both the upper and lower sides, of the circular distortable portion 8 of the apparatus body 1.

Figure 9:
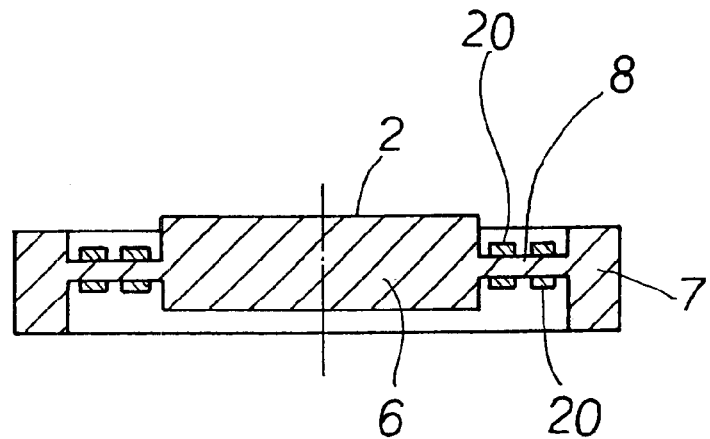
FIG. 9 is a sectional view of the apparatus body, taken along the line F—F in FIG. 8 in FIG. 8, in which the strain gages are attached on both the upper and lower sides of the distortable portion.

FIG. 9 is a sectional view of the apparatus body 1, taken along the line F—F in FIG. 8, showing the arrangement of the strain gages 20 on both the upper and lower sides of the distortable portion 8. The central portion 6 of the apparatus body 1 is higher at the lower side thereof than the lower side of the mounting surface 7, and it is supported in the air by the distortable portion 8 extending from the mounting portion 7 inwardly to the central portion. When a load is applied to the loading surface 2 being the top surface of the central portion 6, the distortable portion 8 is distorted correspondingly, and thus the resistance of the strain gages 20 changes. The resistance change is detected to determine the magnitude of the load or the weight of an object under measurement. The load applied to the top plate 4 is transmitted to the loading surface 2 via the load button 3.

Figure 10:
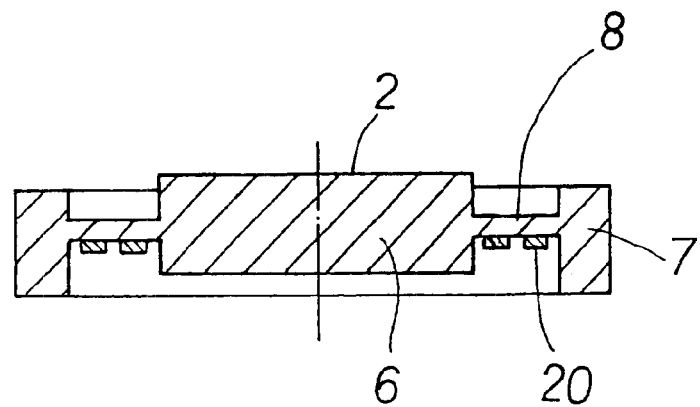
FIG. 10 is a sectional view of the apparatus body, taken along the line F—F in FIG. 8 showing an example in which the strain gages are attached only on the lower sides of the distortable portion.

It should be noted that as shown in FIG. 10, the strain gages 20 may be attached along the quadrisection lines only on the lower side of the circular distortable portion 8 of the apparatus body 1.

Also note that the apparatus body 1 may be any one of variants shown in FIGS. 11 to 15.

Figure 11:
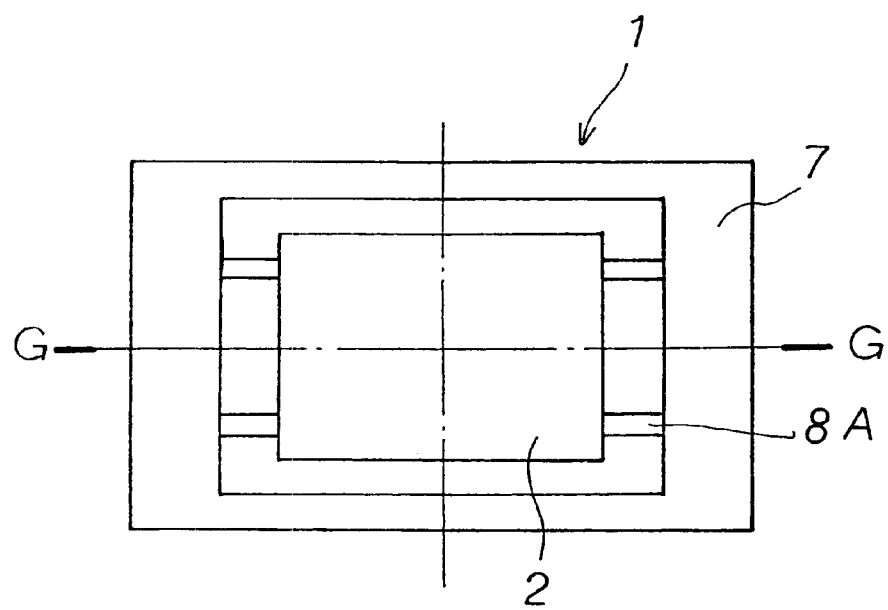
FIG. 11 is a plan view of a variant of the apparatus body according to the present invention.
Figure 12:
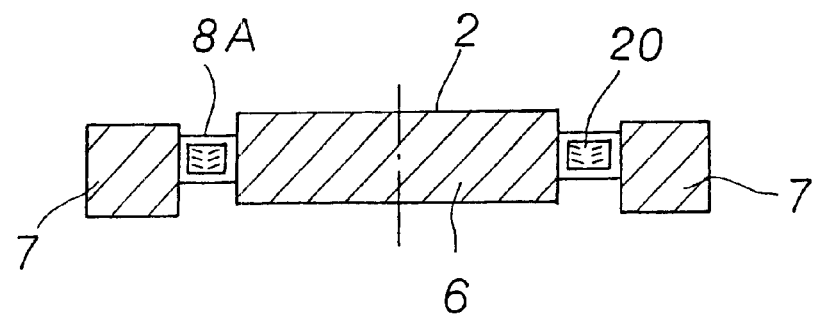
FIG. 12 is a sectional view of the apparatus body, taken along the line G—G in FIG. 8 in FIG. 10.

FIGS. 11 and 12 show together a variant of the apparatus body 1 according to the present invention. This apparatus body 1 has a rectangular shape, not the disk shape. It has distortable bar-like portions 8A in place of the disk-like distortable portion 8 in the above-mentioned embodiment. In this variant, the strain gages 20 are not attached on both the upper and lower sides of the distortable bars 8A but on both the lateral sides of the distortable bars 8A.

Figure 13:
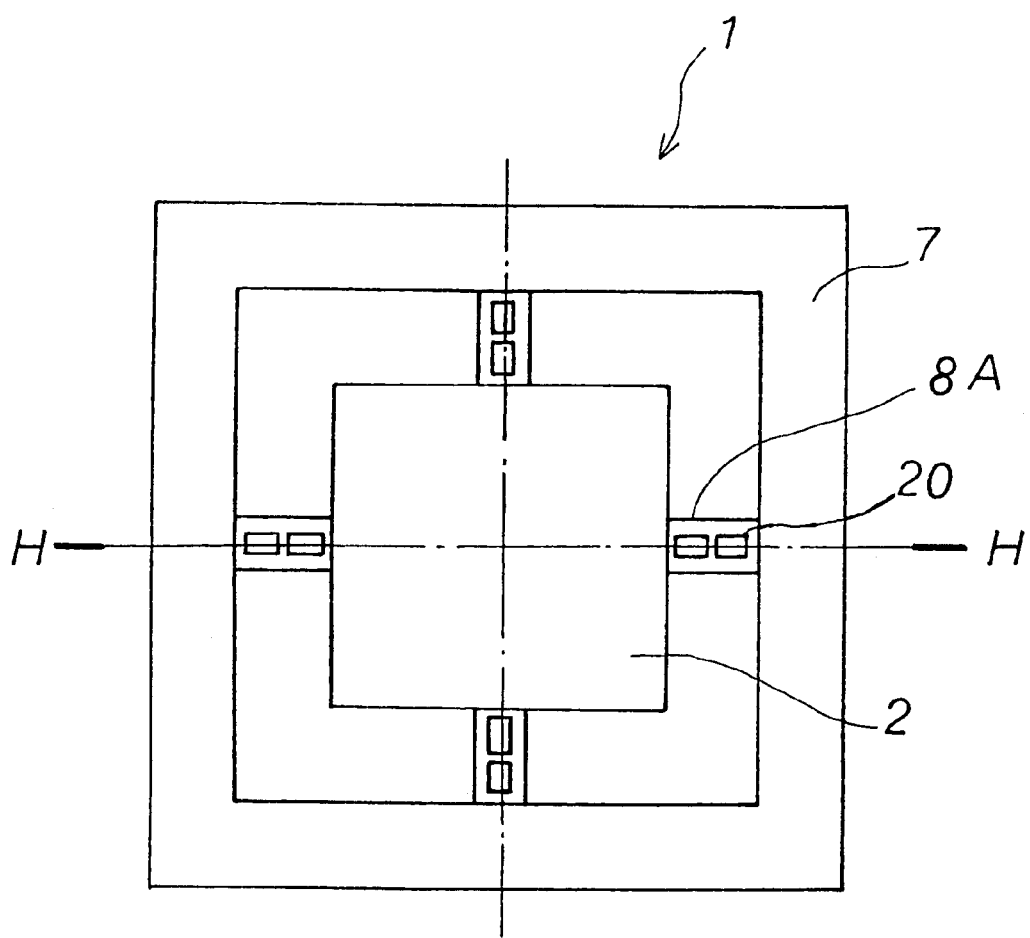
FIG. 13 is a plan view of a still another variant of the apparatus body according to the present invention.
Figure 14:
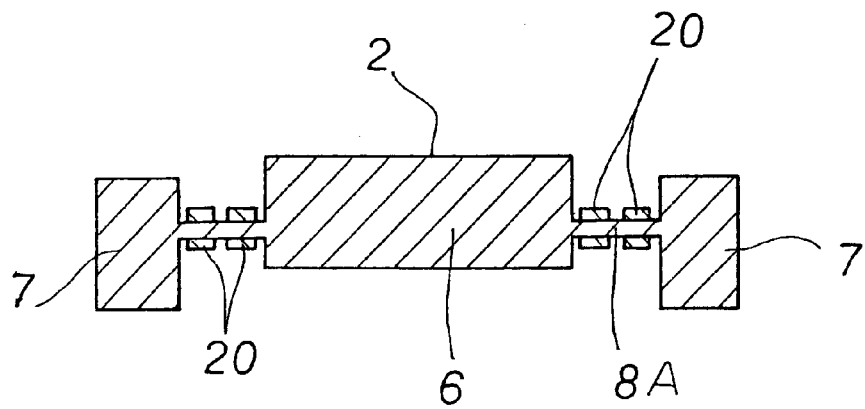
FIG. 14 is a sectional view of the apparatus body, taken along the line H—H in FIG. 13, showing an example in which he strain gages are attached on both the upper and lower sides of the distortable bar-like portions.
Figure 15:
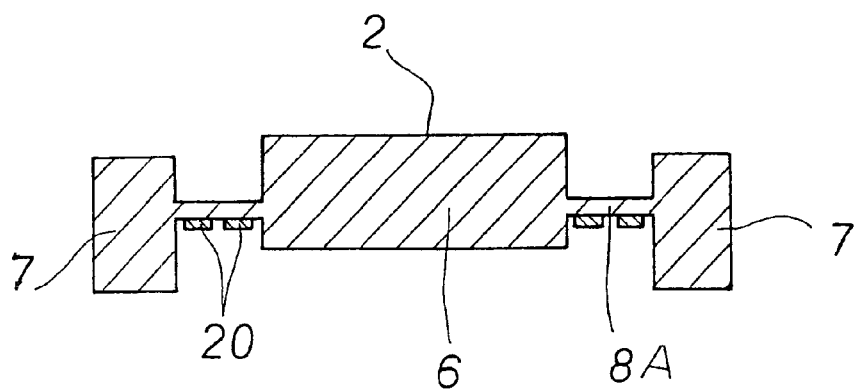
FIG. 15 is a sectional view of the apparatus body, taken along the line H—H in FIG. 13, showing an example in which the strain gages are attached only on the lower sides of the distortable bars.

FIGS. 13 to 15 show together another variant of the apparatus body 1. The apparatus body 1 is generally formed square. One distortable bar 8A is provided per side of the central portion 6 (namely a total of four distortable bars 8A). As shown in FIG. 14, the strain gages 20 are attached on both the upper and lower side of each of the distortable bars 8A. FIG. 15 shows the strain gages 20 attached only on the lower side of each distortable bar 8A.

Next, a second embodiment of the present invention will be discussed below with reference to FIGS. 16 to 25.

Figure 16:
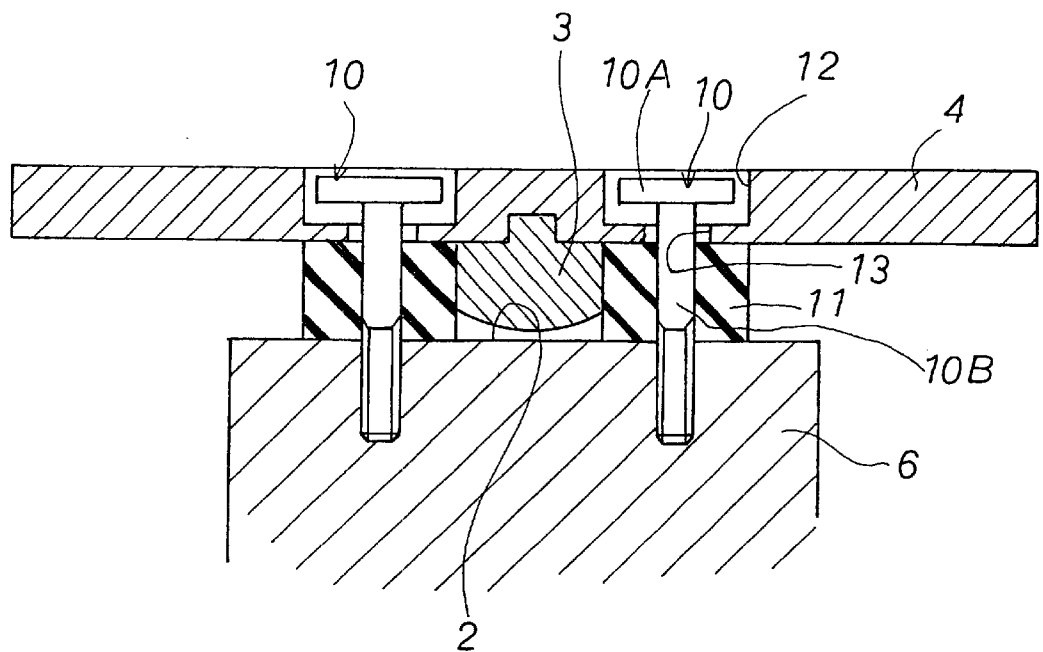
FIG. 16 is a sectional view of a second embodiment of the weighing apparatus according to the present invention.

FIG. 16 is a sectional view of the second embodiment of the weighing apparatus according to the present invention. The weighing apparatus is adapted such that when no load is applied to the top plate 4, the elastic member 11 made of rubber or a resilient material is higher than the load button 3 and the bottom end of the load button 3 is above the loading surface 2. In this second embodiment, there is not used the packing 14 provided in the large hole 12 to enclose the head portion 10A of the connecting member 10. Thus, there is a clearance between the head portion 10A of the connecting member 10 and the bottom wall of the large hole 12, and the clearance allows the top plate 4 to move up and down and tilt within a range permitted by the clearance. Also there is a clearance between the head portion 10A of the connecting member 10 and the side wall of the large hole 12, and there is further a clearance between the shaft portion 10B of the connecting means 10 and the side wall of the small hole 13. These clearances allow the top plate 4 to move horizontally. The load button 3 is rounded at the bottom end thereof opposite to the loading surface 2. That is, the bottom end of the load button 3 is placed in point contact with the loading surface 2.

Figure 17:
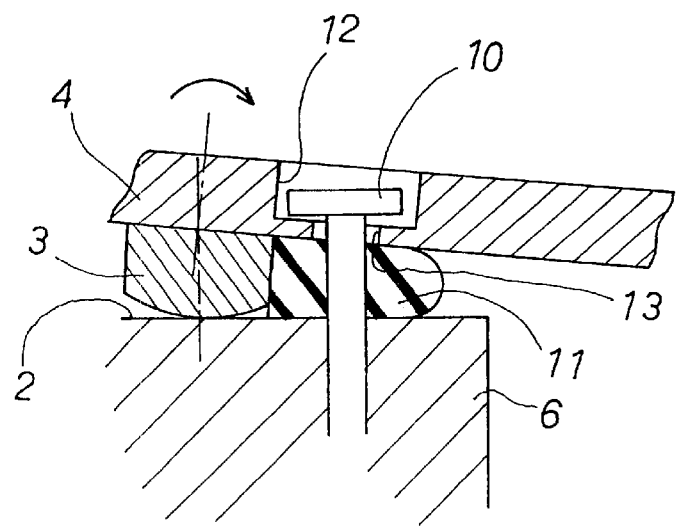
FIG. 17 is a sectional view of the weighing apparatus in FIG. 16, showing the top plate tilted in the direction of arrow.

FIG. 17 is a sectional view of the weighing apparatus in FIG. 16, showing the top plate 4 tilted in the direction of arrow. That is to say, the central axis of the load button 3 is tilted from the vertical position to the right in the plane of drawing. The elastic member 11 is compressed at the right half thereof. At this time, the head portion 10A of the connecting member 10 abuts the bottom of the large hole 12.

Figure 18:
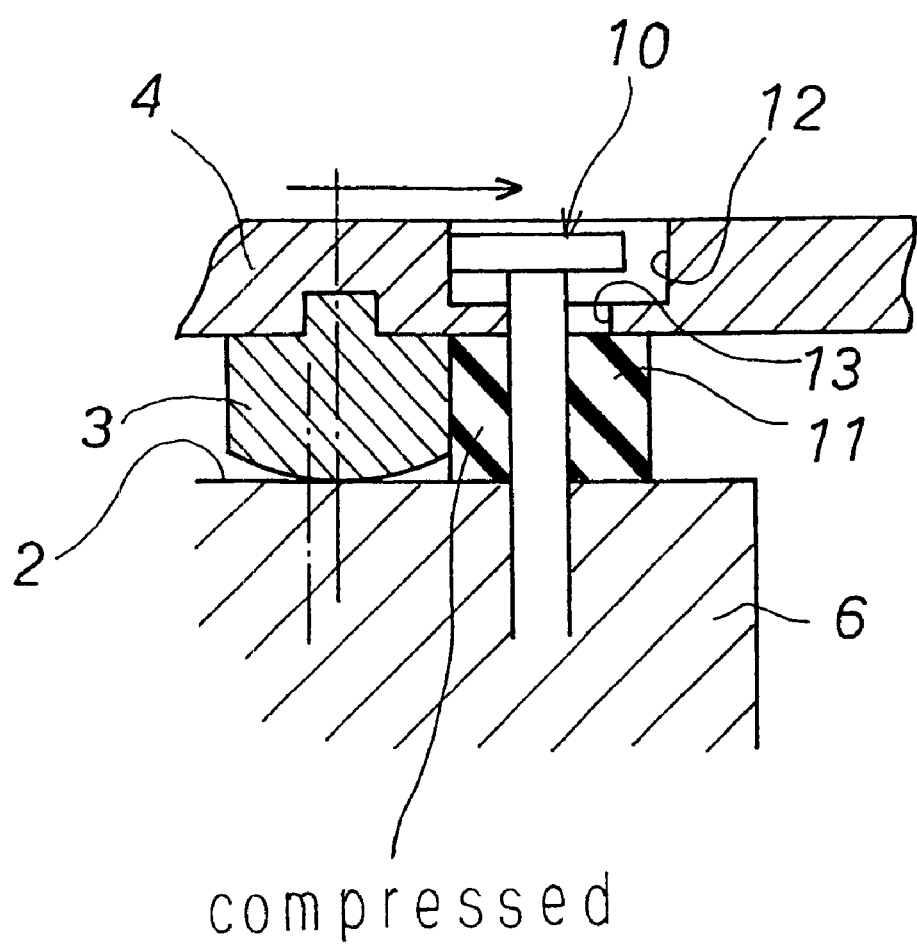
FIG. 18 is a sectional view of the weighing apparatus in FIG. 16, showing the top plate moved horizontally.

FIG. 18 is a sectional view of the weighing apparatus in FIG. 16, showing the top plate 4 acted by a force oriented in the direction of arrow, namely, by a horizontal force.

Note that the elastic member 11 made of rubber or a resilient material may be designed as shown in any of FIGS. 19 to 25.

Figure 19:
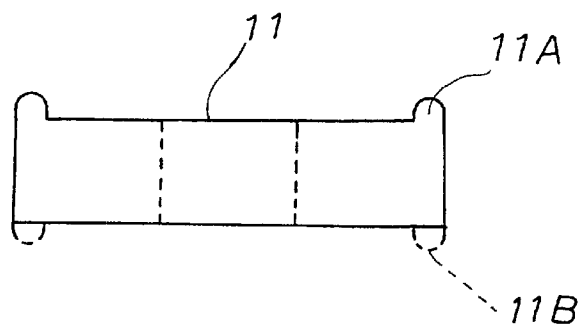
FIG. 19 is a front view of a variant of the elastic member.

FIG. 19 shows a variant of the elastic member 11 in which a projection 11A is formed along the upper outer circumference of the elastic member 11. Also, a projection 11B may be formed along the lower outer circumference of the elastic member 11. Any one of these projections 11A and 11B will do.

Figure 20:
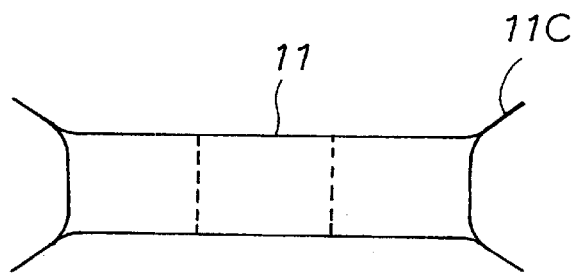
FIG. 20 is a front view of another variant of the elastic member.

FIG. 20 shows another variant of the elastic member 11 in which skirts 11C are formed along both the upper and lower outer circumferences, respectively, of the elastic member 11.

When a vertical load is applied to the top plate 4, the projection 11A or 11B or the skirt 11C on the elastic member 11 shown in FIGS. 19 and 20 will be collapsed. Even when the top plate 4 is rotated or tilted, the projection or skirt is kept collapsed so that no clearance takes place between the top plate 4 and loading surface 2. Thus, no dust or water will enter between the top plate 4 and elastic member 11.

Figure 21:
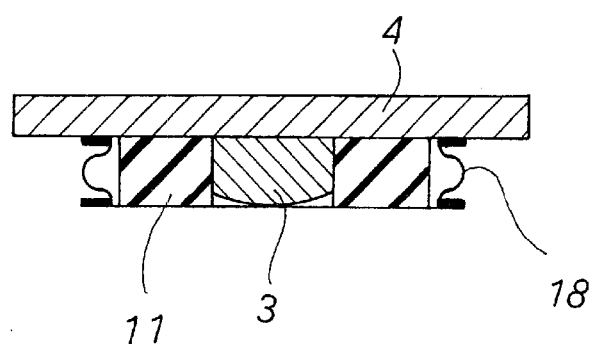
FIG. 21 is a sectional view of the weighing apparatus, showing an example in which a cover is provided around the elastic member.
Figure 22:
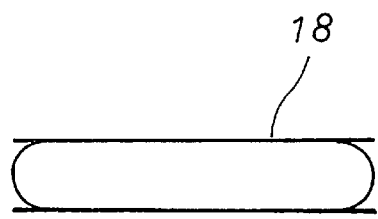
FIG. 22 is a front view of the cover in FIG. 21.

FIG. 21 shows a still another variant of the elastic member 11 in which a cover 18 is provided around the elastic member 11. The cover 18 can effectively be used in an application of the weighing apparatus in which the surface of the elastic member 11 should not be exposed, for example, when the weighing apparatus is to be used in the food or chemical processing line for the purpose of weighing. The cover 18 should preferably be made of a corrosion-resistant metallic material such as stainless steel. As shown in FIG. 22, the cover 18 should have the outer circumference thereof waved to follow up with the tilting or horizontal move of the top plate 4. Also the cover 18 should be thicker than the load button 3 or the elastic member 11.

Figure 23:
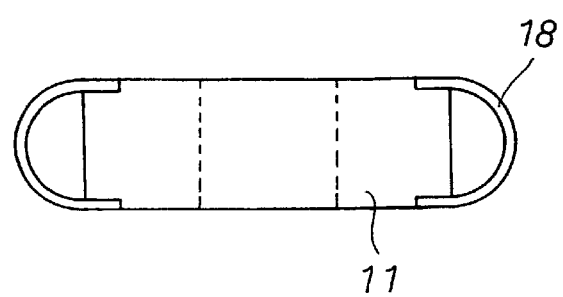
FIG. 23 is a sectional view of the weighing apparatus, showing an example in which the cover is provided integrally with the elastic member.
Figure 24:
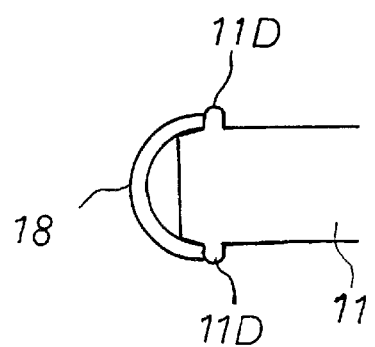
FIG. 24 is a sectional view showing an example in which projections are formed on the elastic member in FIG. 21.

FIG. 23 shows a yet another variant of the elastic member 11 in which the cover 18 is provided integrally with the elastic member 11. In this variant, projections 11D may be formed integrally on the elastic member 11 as shown in FIG. 24.

Figure 25:
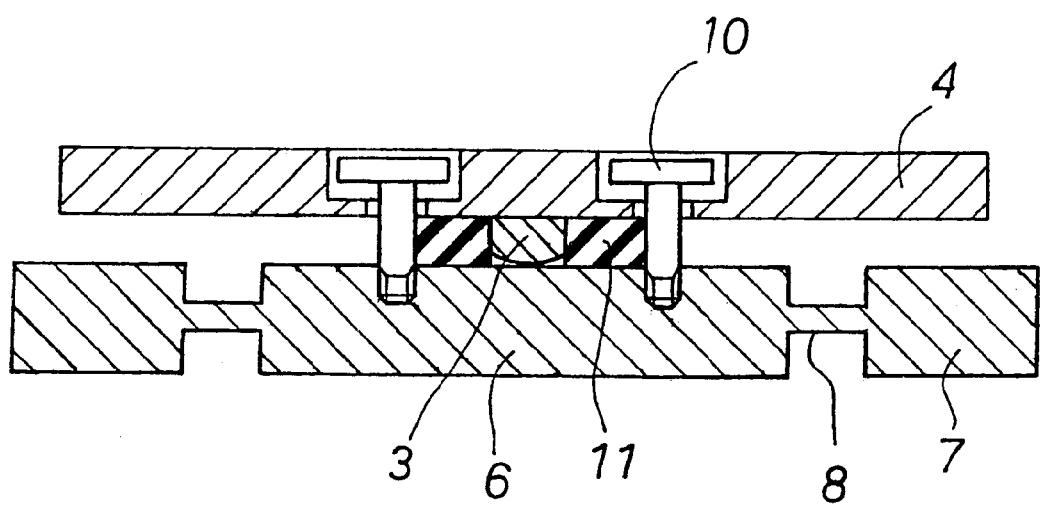
FIG. 25 is a sectional view of a yet another variant of the elastic member.

FIG. 25 is a sectional view of the weighing apparatus, showing the elastic member 11 disposed inside the connecting members 10.

Next, a third embodiment of the weighing apparatus according to the present invention will be described hereinbelow with reference to FIGS. 26 to 31.

Figure 26:
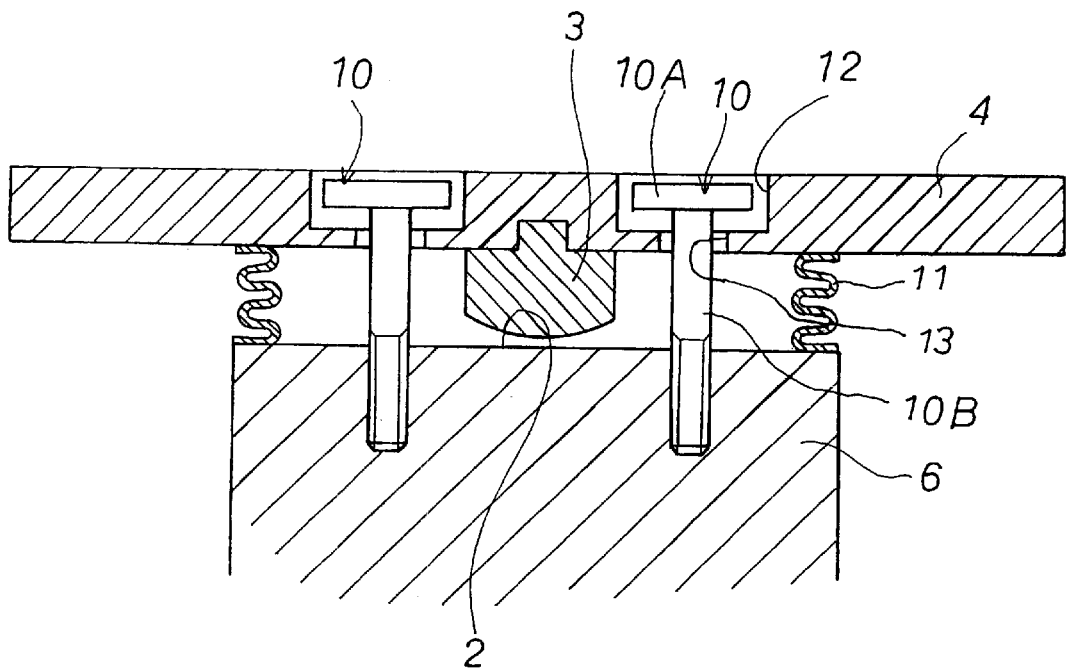
FIG. 26 is a sectional view of a third embodiment of the weighing apparatus according to the present invention.

In this embodiment, the elastic member 11 is provided around the load button 3 and between the loading surface 2 and top plate 4 as shown in FIG. 26. The elastic member 11 is made of a metallic material such as stainless steel. Note that when the top plate 4 is applied with no load, the elastic member 11 is higher than the load button 3. This embodiment has the packing 14 not provided therein. There exists a clearance between the bottom of the head portion 10A of the connecting member 10 and the bottom wall of the large hole 12. The clearance allows the top plate 4 to move up and down and tilt. Also there are a clearance between the head portion 10A of the connecting member 10 and the side wall of the large hole 12, and a clearance between the shaft portion 10B of the connecting member 10 and the side wall of the small hole 13. These clearances permit the top plate 4 to move horizontally. The load button 3 is rounded at the bottom end thereof opposite to the loading surface 2. That is, the bottom end of the load button 3 is placed in point contact with the loading surface 2.

Figure 27:
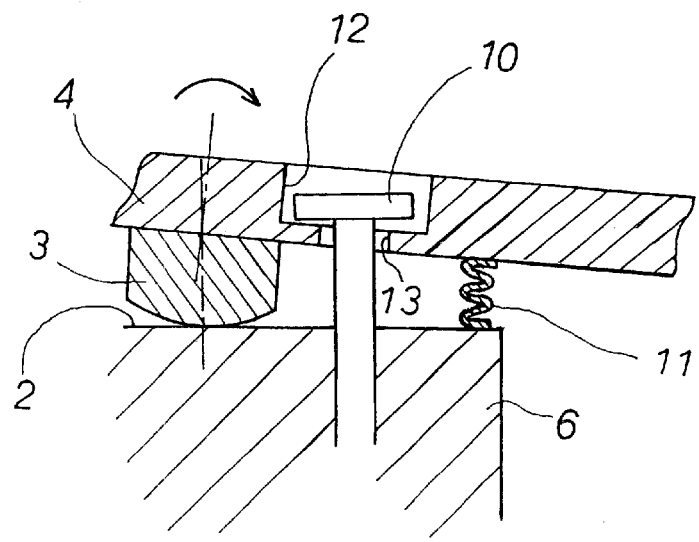
FIG. 27 is a sectional view of the weighing apparatus in FIG. 26, showing the top plate tilted in the direction of arrow.

FIG. 27 is a sectional view of the third embodiment of the present invention, showing the top plate 4 tilted in the direction of arrow. That is to say, the central axis of the load button 3 is tilted from the vertical position to the right in the plane of drawing. The elastic member 11 made of stainless steel is compressed at the right half thereof. At this time, the head portion 10A of the connecting member 10 abuts the bottom of the large hole 12.

Figure 28:
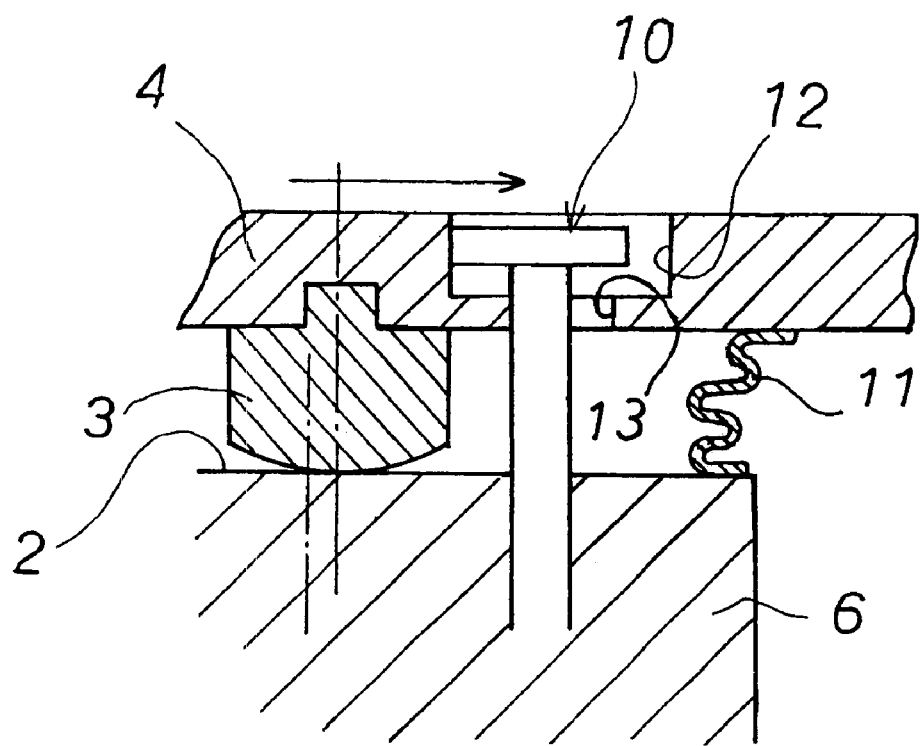
FIG. 28 is a sectional view of the weighing apparatus in FIG. 26, showing the top plate moved horizontally.

FIG. 28 shows the top plate 4 moved horizontally under the action of a force oriented in the direction of arrow, namely, under the action of a horizontal force.

Figure 29:
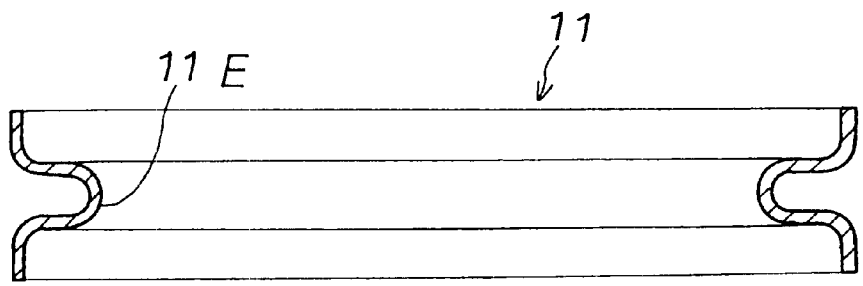
FIG. 29 is an axial sectional view of an elastic member made of a stainless steel.

FIG. 29 is an axial sectional view of a variant of the elastic member 11 made of stainless steel and formed like a ring. The ring-shaped elastic member 11 has a waved portion 11E formed along the full central circumference thereof and projecting inwardly. The elastic member 11 may have the waved portion 11E thereof projected outwardly or the waved portion 11E may be formed from a plurality of waves, like a bellows.

Figure 30:
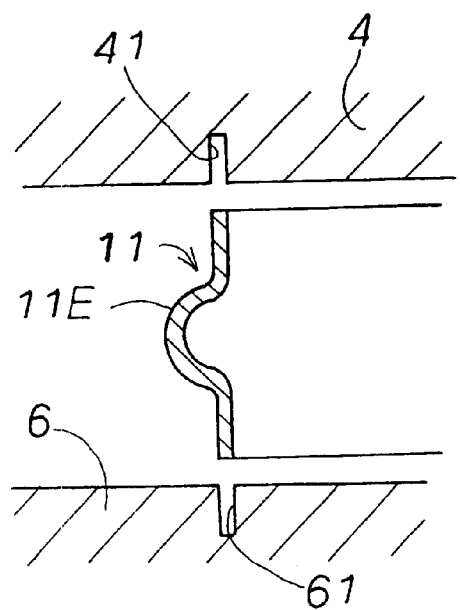
FIG. 30 is a sectional view of the weighing apparatus, showing an example of the method of fixing the stainless steel-made elastic member.

FIG. 30 shows a variant of the third embodiment of the present invention, in which the stainless steel-made elastic member 11 is secured to the top plate 4 and central portion 6 of the apparatus body 6 with the upper and lower edges of the elastic member 11 inserted into recesses 41 and 61 formed in the top plate 4 and central portion 6, respectively.

Figure 31:
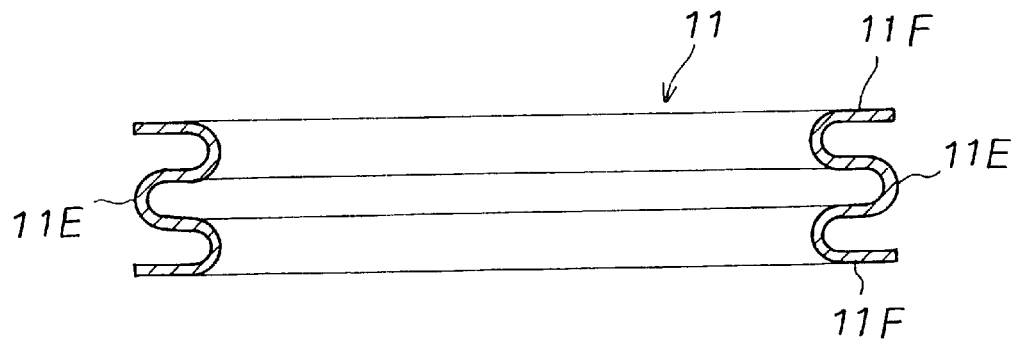
FIG. 31 is an axial sectional view of another variant of the stainless steel-made elastic member.

FIG. 31 shows a still another variant of the stainless steelmade elastic member 11. The elastic member 11 consists of the waved portion 11E, and upper and lower flange portions 11F contiguous to the waved portion 11E. The upper and lower flange portions 11F are secured to the top plate 4 and central portion 6, respectively, by welding, bolting or otherwise.

When a vertical load is applied to the top plate 4, the waved portion 11E of the elastic member 11 shown in FIGS. 29 and 31 will be compressed. Even when the top plate 4 is rotated or tilted, the waved portion 11E is kept compressed so that no clearance takes place between the top plate 4 and loading surface 2. Thus, no dust or water will enter between the top plate 4 and elastic member 11.

The elastic member 11 made of rubber or a resilient material is likely to be deteriorated when used with organic solvent, chemical, oil or the like, but the elastic member 11 made of stainless steel will not. However, the stainless steel-made elastic member 11 can be used even in an atmosphere in which a gas of organic solvent exists.

Figure 32:
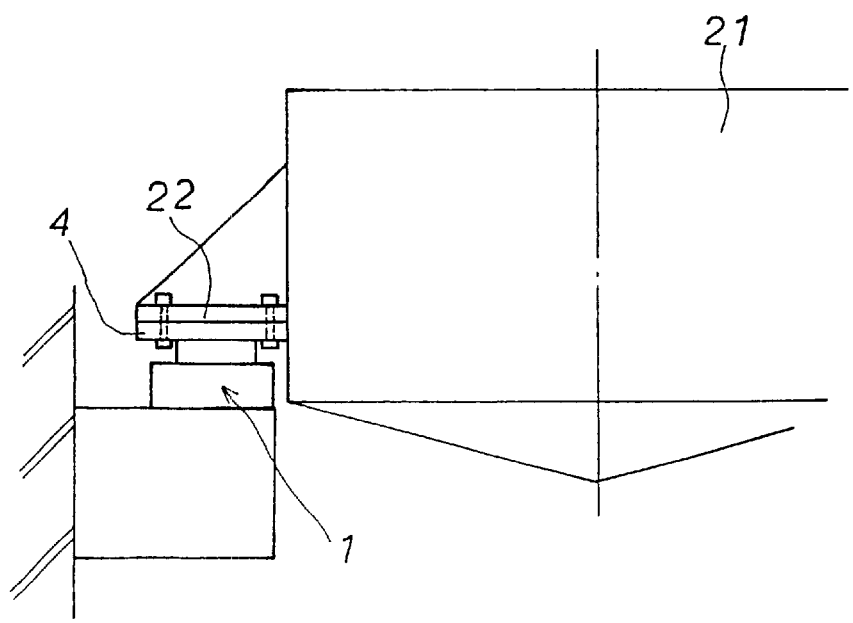
FIG. 32 is a front view of a fourth embodiment of the weighing apparatus according to the present invention, with a hopper tank installed to the top plate.

FIG. 32 is a front view of a fourth embodiment of the weighing apparatus according to the present invention. As shown, a bracket 22 supporting the hopper tank 21 are installed on the top plate 4 of the weighing apparatus according to the present invention. The bracket 22 and the top plate are connected each other, at plurality points. Generally, the hopper tank 21 has a plurality of brackets 22. Thus, one weighing apparatus of he present invention is used with each of the brackets 22, and each of the brackets 22 is installed on each of the top plates 4 of the apparatus bodies 1.

In the weighing apparatus according to the present invention, the top plate 4 can freely be tilted and moved horizontally and vertically until the connecting members 10 abut the side and bottom walls of the large and small holes 12 and 13. Therefore, it is possible to accommodate a force which would degrade the performance of the apparatus body 1, for example, a horizontal force developed due to a thermal shrinkage caused by a temperature change of the hopper tank 21 and a tilting force (rotating force) developed due to deflection of the brackets 22. Also, after such force is removed, the top plate 4 can be returned to its initial position due to the elastic restoring force of the elastic member 11. The top plate 4 is permitted to move within a predetermined range. That is, when the connecting member 10 abuts the wall of the hole, the top plate 4 is blocked from moving any further. Thus since the connecting member 10 functions as a stopper, so no bracing or stopper may be provided on the apparatus body 1. Also, since a vertical downward force is transmitted by the load button 3 to the apparatus body 1, so the elastic member 11 may be designed with such a vertical downward not taken in consideration. Therefore, since the elastic member 11 has an elasticity suiting only a tilting force and horizontal force, so it may be designed compact to have a small horizontal section.

As having been described in the foregoing, the weighing apparatus according to the present invention is capable of measuring a large vertical load and sufficiently accommodating deformations caused by horizontal moving since the elastic member is provided around the load button and between the loading surface and top plate and the top plate is connected to the loading surface by the connecting members for the top plate to be movable horizontally within a predetermined range and tiltable about the load button and not to come out upward. Further, since the load button is rounded at the bottom end thereof opposite to the loading surface, the top plate can freely rotate about the point contact of the load button with the loading surface, whereby no unnecessary force is transmitted to the loading surface. Since the elastic member is higher than the load button, when the top plate tilts, namely, when a rotating force acts on the top plate, the elastic member is compressed under the downward-going portion of the top plate while it is decompressed or expanded for the compressed extent at the other portion thereof under the upward-going portion of the top plate. Thus, there will not arise any clearance between the elastic member and top plate at all times. The elastic member made of rubber or a resilient material will be degraded with organic solvent, chemical, oil or the like. However, the elastic member made of a thin metal sheet will not be degraded or attacked by such organic solvent, chemical, oil or the like and thus the weighing apparatus with the metal-made elastic member can be used in an atmosphere in which a gas of organic solvent exists.

What is claimed is:

1. A weighing apparatus comprising:
   an apparatus body with strain gages;
   a load button to transmit a weight of an object to be measured to a loading surface of the apparatus body;
   a top plate on one side of which the load button is installed and to the other side of which the object weight is applied;
   the load button having a semispherical bottom surface and a top surface fixed to the top plate and the semispherical bottom surface being opposite the load;
   an elastic member having a greater height than a protrusion distance of the load button from the top plate and, provided around the load button, and provided between the loading surface and top plate; and connecting members to connect the top plate to the loading surface in such a manner that the top plate can move horizontally within a predetermined range and tilt about the load button, and to prevent the top plate from coming out upward.

2. The weighing apparatus as set forth in claim 1, wherein the connecting member includes a linkage member that has a head portion and a shaft portion thinner than the head portion, the shaft portion has an end thereof fixed in the loading surface, the top plate has formed therein a large-diameter hole and a small-diameter hole, the head portion inserted in the larger hole and the shaft portion inserted in the smaller hole are allowed to move horizontally in the large and small holes, respectively, and the diameter of the head portion is larger than that of the smaller hole.

3. The weighing apparatus as set forth in claim 1, wherein the elastic member is made of rubber or a resilient material.

4. The weighing apparatus as set forth in claim 1, wherein the elastic member is made of a thin metal sheet.

5. The weighing apparatus as set forth in claim 1, wherein a separation between the top plate and the loading surface is less than a diameter the semispherical bottom surface.

6. A weighing apparatus comprising:

an apparatus body having strain gages and a loading surface;

a load button to transmit a weight of an object to be measured to the loading surface of the apparatus body;

a top plate on one side of which the load button is installed and to the other side of which the object weight is applied;

the load button having a semispherical bottom surface and a top surface fixed to the top plate and the semispherical bottom surface being opposite the load;

an elastic member provided around the load button and between the loading surface and top plate; and connecting members to connect the top plate to the loading surface in such a manner that the top plate can move horizontally within a predetermined range and tilt about the load button, and to prevent the top plate from coming out upward.

7. The weighing apparatus as set forth in claim 6, wherein the connecting member includes a linkage member that has a head portion and a shaft portion thinner than the head portion, the shaft portion has an end thereof fixed in the loading surface, the top plate has formed therein a large-diameter hole and a small-diameter hole, the head portion inserted in the larger hole and the shaft portion inserted in the smaller hole are allowed to move horizontally in the large and small holes, respectively, and the diameter of the head portion is larger than that of the smaller hole.

8. The weighing apparatus as set forth in claim 6, wherein the elastic member is made of rubber or a resilient material.

9. The weighing apparatus as set forth in claim 6, wherein the elastic member is made of a thin metal sheet.

10. The weighing apparatus as set forth in claim 6, wherein a separation between the top plate and the loading surface is less than a diameter of the semispherical bottom surface.

* * * * *